United States Patent [19]
Do et al.

[11] Patent Number: 5,958,296
[45] Date of Patent: Sep. 28, 1999

[54] PHOSPHOR COMPLEX HAVING HIGH BRIGHTNESS

[75] Inventors: Young-rag Do, Suwon-Si; Joon-bae Lee, Yongin-Si; Chang-won Park, Suwon-Si; Mi-ran Song, Seoul, all of Rep. of Korea

[73] Assignee: Samsung Display Devices Co., Ltd., Suwon-Si, Rep. of Korea

[21] Appl. No.: 08/960,967

[22] Filed: Oct. 30, 1997

[30] Foreign Application Priority Data

Oct. 31, 1996 [KR] Rep. of Korea ............... 96-51358
Dec. 30, 1996 [KR] Rep. of Korea ............... 96-78404
Jun. 9, 1997 [KR] Rep. of Korea ............... 97-23573

[51] Int. Cl.[6] .................... C09K 11/02; C09K 11/68
[52] U.S. Cl. .................. 252/301.4 R; 252/301.6 S; 252/301.4 S; 428/403; 428/404
[58] Field of Search ............ 252/301.4 R, 301.4 S, 252/301.6 S; 428/403, 404

[56] References Cited

U.S. PATENT DOCUMENTS 4,377,769 3/1983 Beatty et al. ............... 313/495
4,680,231 7/1987 Yamaura et al. ............ 428/407
5,667,724 9/1997 Petersen ..................... 252/301.4 R

FOREIGN PATENT DOCUMENTS 0466053 1/1992 European Pat. Off. .
466053 1/1992 European Pat. Off. .
4124450 2/1992 Germany .
4-63889 2/1992 Japan .

OTHER PUBLICATIONS

"Fluorescent Material for Mfg. High Density CRT—Contains At Least 1 Of Oxide, Hydroxide And Silicate Of Magnesium, Chromium, Vanadium or Zirconium, On Surface" WPI/Derwent Abstract of JP900172700 (Feb. 28, 1992).

*Primary Examiner*—C. Melissa Koslow
*Attorney, Agent, or Firm*—Christie, Parker & Hale, LLP

[57] ABSTRACT

An improved red, green or blue phosphor complex produced by adhering chromium compound on the red, green or blue phosphor using a polymer binder or an inorganic binder, or without a binder, has high brightness without changing the characteristics of the phosphor

9 Claims, 4 Drawing Sheets

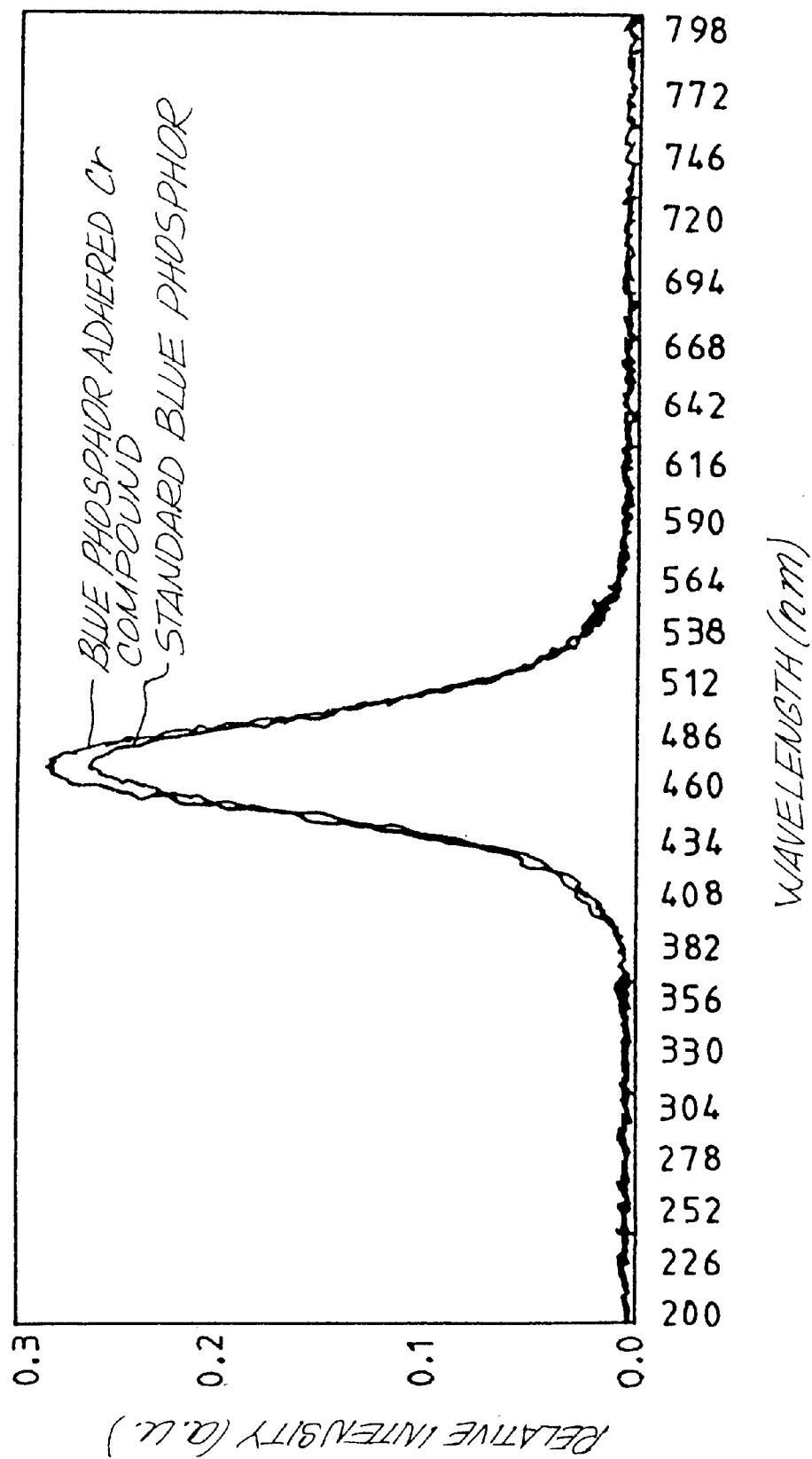

PHOSPHOR COMPLEX HAVING HIGH BRIGHTNESS

CROSS-REFERENCE TO RELATED APPLICATIONS

This application claims priority of Korean Patent Application No. 96-51358, filed Oct. 31, 1996, Korean Patent Application No. 96-78404, filed Jun. 9, 1997, and Korean Patent Application No. 97-23573, filed Jun. 9, 1997.

BACKGROUND OF THE INVENTION (a) Field of the invention

The present invention relates to an improved phosphor complex and, more specifically, to an improved phosphor complex having high brightness which includes a conventional phosphor and a material which is adhered on the conventional phosphor, and capable of facilitating electron transfer.

(b) Description of the Related Arts

Generally, visible rays are emitted by almost all materials when the materials are heated at high temperatures. However, some materials luminate visible rays at ambient temperatures when an electron beam or ultraviolet light is radiated to the material. Generally, this phenomenon is called "luminescene" and the material causing this phenomenon is called a phosphor. Nowadays, phosphors, which are used in a Braun tubes, are prepared by mixing an activator with a host material and then calcinating them at 700° C. to 1300° C. for over 30 minutes. The host material includes oxide compounds of calcium, strontium, barium, beryllium, magnesium, zinc, cardium et al., sulfide compounds thereof, selenide compounds thereof, fluoride compounds thereof, silicate compounds thereof, phosphate compounds thereof, arsenate compounds thereof, and tungstate compounds (wolframate) thereof. In addition, manganese, magnesium, copper, bismuth, antimony, lead, titanium and various rare earth elements are used as the activators. In calcinating, a flux, which is a compound having good solubility for the phosphor, may also be used to grow the particle size of the phosphor.

Conventional zinc sulfide (ZnS) type phosphor comprises zinc and cadmium, which belongs to the IIb class of the Periodic table, and sulfur, selenide (Se), or tellurium (Te) which belong to the VIb class of the Periodic table, as the host material. Copper, silver and gold, which belong to the lb class of the Periodic table are used as activators and aluminum and chloride are used as co-activators. Examples of ZnS type phosphor are ZnS: Cu, Au, Al (green phosphor) and ZnS:Ag, Cl (blue phosphor). ZnS type phosphor has been mainly used as phosphor for cathode ray tubes because the phosphor can luminate various visible rays by changing the host material or the activator. The ZnS type phosphors for cathode ray tubes are one of the most efficient types of phosphor. However, they have a disadvantage in that the Vd (dead voltage) at which luminescence starts is high and brightness saturation phenomena occur. Brightness saturation means that a further increase of brightness does not occur.

Furthermore, rare earth type phosphors are actively studied as red phosphor, and $YVO_4$:Eu is practically used as a red phosphor. The host material of thereof comprises a compound selected from, for example, $YVO_4$, $Y_2O_2S$, $La_2O_2S$ and $Gd_2O_2S$ et al. Moreover, rare earth elements comprising europium (Eu), terbium (Tb), samarium (Sm), cerium (Ce), and/or praseodymium (Pr) are mainly used as the activators. The characteristic of the phosphor is that its energy efficiency is lower than ZnS type group phosphors, but brightness saturation does not occur. The phosphors which luminate red color, among the above phosphors, are $Y_2O_3$:$Eu^{3+}$ and Y(V, P)$O_4$:$Eu^{3+}$. Recently, $Y_2O_2S$:$Eu^{3+}$ has been developed as a rare earth type red phosphor.

In the mean time, phosphors can be classified into white, red, green, yellow and blue phosphors by their colors. Nowadays, three colors, red, green and blue (R. G. B) phosphors are mainly used. Until recently, green phosphor has been actively developed, and examples thereof are (ZnCd)S:Cu,Al, ZnS:Cu,Al, ZnS:Cu,Al,Au, $Zn_2SiO_4$:Mn, $Zn_2SiO_4$:Mn,As, ZnO, and (ZnCd):S:Cu,Al, et al.

Nowadays, demand for color display devices ("CDTs") have increased according to the development of multimedia, and thereby a phosphor having higher brightness than the present phosphors is required. The improvement of brightness of phosphor is an essential to improve quality and increase precision of Braun tubes.

Recently, a sensitizer has been added to the phosphor in order to increase the brightness of red phosphor. In order to increase the brightness of green phosphor, a compound selected from Bi, Tb and Sb, et al., is added to the phosphor. Furthermore, in order to increase the brightness of blue phosphor, a material which is capable of facilitating electron-hole pairs transfer or a sensitizer is added to the phosphor. A co-activator having a wavelength of luminating spectrum corresponding to the wavelength of absorption spectrum of an activator is used as the sensitizer.

However, the above methods have disadvantages in that they are complicated and difficult because a conventional process for preparing a phosphor and condition thereof should be changed by additionally using sensitizers or Bi, Tb and Se, et al. Furthermore, the brightness of the phosphors was not increased as expected by the above methods.

SUMMARY OF THE INVENTION

In order to solve the above mentioned disadvantages of the conventional phosphor, the present invention provides an improved phosphor complex having high brightness without deteriorating the characteristics of phosphors.

The present invention also provides an improved phosphor complex having high brightness which can be easily prepared without changing a conventional process of preparing phosphor.

In order to achieve the above objects, the present invention provides an improved phosphor complex having high brightness comprising phosphor and a material that adheres to a surface of the phosphor and that is capable of facilitating eletron transfer.

In the present invention, the material which is capable of facilitating electron transfer is preferably a water-insoluble chromium compound, and more preferably a chromium compound selected from the group consisting of chromium phosphate, chromium hydroxide and chromium fluoride. The preferred amount of the chromium compound to be adhered to the phosphor is 0.00001 to 5.0 wt % based on the weight of the phosphor. If the phosphor is red phosphor, the most preferred amount of chromium compound to be adhered to the phosphor is 0.00001 to 1.0 wt % based on the weight of the phosphor, and if the phosphor is green or blue phosphor, the most preferred amount of chromium compound to be adhered to the phosphor is 0.00001 to 5.0 wt % based on the weight of the phosphor. The preferable diameter of the chromium compound is 10 nm to 1 μm.

The phosphor may be selected from the group consisting of red phosphor comprising $Y_2O_2S$:Eu or $Y_2O_3$:Eu, green phosphor comprising ZnS:Cu, Al or ZnS:Cu,Al,Au and blue phosphor comprising ZnS:Ag or ZnS:Ag,Cl.

The improved phosphor complex having high brightness of this invention may be prepared by adhering a material which is capable of facilitating electron transfer on the phosphor using a binder, or by precipitating the material on the phosphor.

In the above method of preparing an improved phosphor complex, the preferred binder is selected from the group consisting of a polymer binder and an inorganic binder. More preferably, the polymer binder is a compound selected from the group consisting of gelatin, a mixture of gelatin and arabia gum, casein and polymethylmethacrylate (PMMA), and an inorganic binder is a compound selected from the group consisting of potassium silicate, zinc hydroxide and magnesium phosphate.

Furthermore, in the above method of preparing an improved phosphor complex, a hardening agent may be used to firmly adhere the material which is capable of facilitating electrons transfer on the phosphor. The preferred hardening agent is glutaraldehyde.

Additional objects, advantages and novel features of the invention will be set forth in part in the description which follows, and in part will become apparent to those skilled in the art upon examination of the following or may be learned by practice of the invention. The object and advantages of the invention may be realized and attained by means of the instrumentalities and combinations particular pointed in the appended claims.

BRIEF DESCRIPTION OF THE DRAWINGS

FIG. 4 is a graph showing luminescence spectrums of conventional blue phosphor on which chromium compounds are not adhered and blue phosphor on which chromium compounds are adhered according to another embodiment of the present invention.

Figure 1:
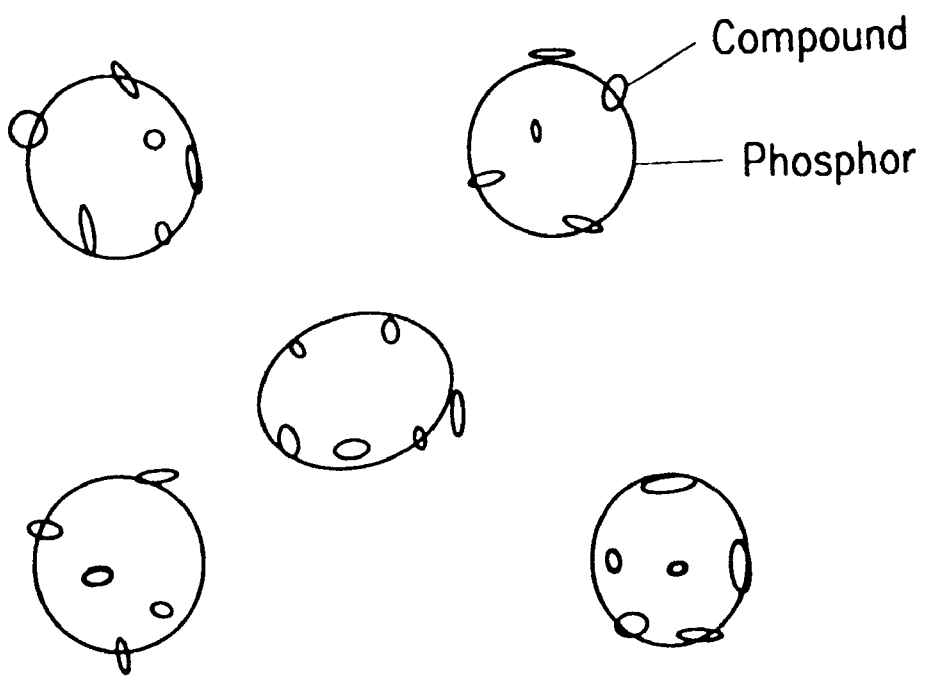
FIG. 1 is a diagram showing a structure of an improved phosphor complex according to the present invention.

In the following detailed description, only the preferred embodiment of the invention has been shown and described, simply by way of illustration of the best mode contemplated by the inventors of carrying out the invention. As will be realized, the invention is capable of modification in various obvious respects, all without departing the scope of the invention. Accordingly, the drawing and description are regarded as illustrative in nature, and not as restrictive.

Detailed Description of the Preferred Embodiment

The present invention is illustrated with reference to FIG. 1.

As shown in FIG. 1, the improved phosphor complex of the present invention may be prepared by adhering a material which is capable of facilitating electron transfer on the surface of a phosphor. For example a chromium compound is adhered on the surface of a phosphor by using a polymer binder or an inorganic polymer, or precipitated on the surface of the phosphor. In addition to the above method, the improved phosphor complex of the present invention may be prepared by any conventional method which can adhere a chromium compound on phosphor. The material which is adhered on the surface of phosphor and is capable of facilitating electron transfer easily transfers electrons to the phosphor by receiving a high voltage electron beam on the surface of phosphor, thereby increasing the brightness of the phosphor by increasing the amount of phosphor to be luminated. A final product of phosphor or a phosphor which is not coated with silicon dioxide ($SiO_2$) or a pigment, can be used as a phosphor of the present invention.

The present invention is further explained in more detail with reference to the following examples which are within the scope of this invention.

EXAMPLE 1

0.01 parts by weight of chromium phosphate were added to 0.2 parts by weight of arabia gum and shaken, and then, 100 parts by weight of $Y_2O_2S$:Eu were added thereto and shaken. Thereafter, 0.2 parts by weight of gelatin were added to the product and mixed. 10 wt % of acetic acid was then added to the mixed product to adjust the pH of the mixed product to a pH of 4 in order to adhere the gelatin and the Cr compound to the phosphor. After adding ice to the resulting product to adjust the temperature of the resulting product to 4° C., gelatin and glutaraldehyde were added thereto to polymerize arabia gum with gelatin and washed with pure water. Thereafter, the obtained phosphor was filtered and dried in an oven at 100° C. for over one day to produce red phosphor.

EXAMPLES 2–8

Red phosphor was produced by the same procedure described in Example 1 except the amount of chromium phosphate was changed as shown in Table 1 below.

EXAMPLE 9

0.03 parts by weight of chromium phosphate were added to 0.2 parts by weight of arabia gum and shaken, and then 100 parts by weight of $Y_2O_3$:Eu were added thereto and shaken. Thereafter, 0.2 parts by weight of gelatin were added to the product and mixed. 10 wt % of acetic acid was then added to the mixed product to adjust the pH of the mixed product to a pH of 4 in order to adhere the gelatin and the Cr compound to the phosphor. After adding ice to the resulting product to adjust the temperature of the resulting product to 4° C., gelatin and glutaraldehyde were added thereto to polymerize arabia gum with gelatin, and washed with pure water. Thereafter, the obtained phosphor was filtered and dried in an oven at 100° C. for over one day to produce red phosphor.

EXAMPLE 10

After 0.03 parts by weight of chromium phosphate were shaken, 100 parts by weight of $Y_2O_2S$:Eu were added thereto and shaken for 30 minutes. Thereafter, 0.5 parts by weight of $ZnSO_4$ were added to the product and shaken for 30 minutes. $NH_4OH$ was added to the resulting product to adjust the pH of the resulting product to a pH of 7 in order to form zinc hydroxide as a binder, and the obtained phosphor was dried at about 100° C. in an oven for over one day to produce red phosphor.

Comparative Example 1

Red phosphor was prepared by the same procedure as in Example 1 except that a chromium phosphate was not used.

The relative brightness and color coordinates of the phosphor produced by the above examples 1 to 10 and comparative example 1 were determined and the results thereof are shown in Table 1 below. The relative brightness was determined by applying 10 kVs of voltage to the demountable CRT on which the phosphor of the examples 1 to 10 and comparative example 1 were coated. The phosphor screen was prepared by a precipitation method by using barium acetate and potassium silicate.

TABLE 1

|  | Amounts of Cr compound to be added (parts by weight) | Relative brightness (%) | Color coordinate (x, y) |
| --- | --- | --- | --- |
| Example 1 | 0.01 | 103 | 0.627, 0.351 |
| Example 2 | 0.02 | 108 | 0.627, 0.350 |
| Example 3 | 0.03 | 110 | 0.629, 0.353 |
| Example 4 | 0.04 | 107 | 0.628, 0.353 |
| Example 5 | 0.05 | 104 | 0.629, 0.352 |
| Example 6 | 0.07 | 103 | 0.629, 0.353 |
| Example 7 | 0.10 | 103 | 0.628, 0.352 |
| Example 8 | 0.15 | 101 | 0.630, 0.353 |
| Example 9 | 0.03 | 107 | 0.645, 0.347 |
| Example 10 | 0.03 | 106 | 0.629, 0.352 |
| Comparative example 1 | 0 | 100 | 0.626, 0.351 |

EXAMPLE 11

0.01 parts by weight of chromium phosphate were added to 0.05 parts by weight of arabia gum and shaken, and then 100 parts by weight of ZnS:Cu,Al were added thereto and shaken. Thereafter, 0.05 parts by weight of gelatin were added to the product and mixed. 10 wt % of acetic acid was then added to the mixed product to adjust the pH of the mixed product to a pH of 4 in order to adhere the gelatin and the Cr compound to the phosphor. After adding ice to the resulting product to adjust the temperature of the resulting product to 4° C., glutaraldehyde was added to the product to polymerize arabia gum with gelatin, and washed with pure water. Thereafter, the obtained phosphor was dried at about 100° C. in an oven for over one day to produce green phosphor.

EXAMPLES 12–18

Green phosphor was prepared by the same procedure described in Example 11 except the amount of chromium compound was changed as shown in Table 2 below.

EXAMPLE 19

Green phosphor was prepared by the same procedure described in Example 11 except that ZnS:Cu,Al,Au was used as a phosphor and the amount of chromium compound to be added was changed as shown in Table 2 below.

EXAMPLE 20

0.1 parts by weight of $ZnSO_4$ were added to 0.05 parts by weight of chromium phosphate, 100 parts by weight of ZnS:Cu,Al,Au were added thereto, and the product was shaken. Thereafter, $NH_4OH$ was added to the resulting product to adjust the pH of the resulting product to a pH of 9 in order to adhere Cr compound to phosphor. The obtained phosphor was dried at about 100° C. for over one day to produce green phosphor.

EXAMPLE 21

0.05 parts by weight of water-soluble chromium sulfate were dissolved in distilled water, and 100 parts by weight of ZnS:Cu,Al were added thereto and shaken. Thereafter, an excess of ammonium hydroxide was added thereto to form a precipitate of chromium compound on the surface of the phosphor. The phosphor obtained was filtered and dried at about 100° C. for over one day to produce green phosphor.

Comparative Example 2

Green phosphor was prepared by the same procedure as in Example 11 except that a chromium compound was not used.

Comparative Example 3

Green phosphor was prepared by the same procedure as in Comparative example 2 except that ZnS:Cu, Al, Au was used as phosphor.

The relative brightness and color coordinates of the phosphors prepared by the above examples 11 to 21 and comparative examples 2 to 3 were determined, respectively and the results thereof are shown in Table 2 below. The relative brightness was determined by applying 10 kVs of voltage to the demountable CRT on which the phosphors of the examples 11 to 21 and comparative examples 2 to 3 are coated. The phosphor screen was prepared by a precipitation method by using barium acetate and potassium silicate.

TABLE 2

|  | Amounts of Cr compound to be added (parts by weight) | Relative brightness (%) | Color coordinate (x, y) |
| --- | --- | --- | --- |
| Example 11 | 0.01 | 104 | 0.288, 0.613 |
| Example 12 | 0.02 | 108 | 0.288, 0.614 |
| Example 13 | 0.03 | 110 | 0.288, 0.613 |
| Example 14 | 0.04 | 109 | 0.289, 0.614 |
| Example 15 | 0.05 | 107 | 0.289, 0.615 |
| Example 16 | 0.07 | 104 | 0.289, 0.613 |
| Example 17 | 0.10 | 102 | 0.289, 0.613 |
| Example 18 | 0.15 | 102 | 0.294, 0.614 |
| Example 19 | 0.03 | 111 | 0.313, 0.596 |
| Example 20 | 0.05 | 105 | 0.292, 0.614 |
| Example 21 | 0.05 | 106 | 0.290, 0.615 |
| Comparative example 2 | 0 | 100 | 0.288, 0.612 |
| Comparative example 3 | 0 | 100 | 0.315, 0.597 |

EXAMPLE 22

0.02 parts by weight of chromium phosphate were added to 0.13 parts by weight of arabia gum and shaken, and then 100 parts by weight of the ZnS:Ag were added thereto and shaken. Thereafter, 0.13 parts by weight of gelatin were then added to the product and mixed. 10% acetic acid was added to the mixture to adjust pH 3.4 to adhere gelatin and chromium phosphate to the phosphor. After adding ice to the phosphor to adjust a temperature of the phosphor to 4° C., 1 ml of glutaraldehyde was added thereto to polymerize arabia gum and gelatin and washed with pure water. The product was dried at a temperature of 100° C. in an oven for one day or more to produce blue phosphor having high brightness.

EXAMPLES 23–27

The blue phosphor having high brightness was prepared by the same procedure described in Example 22 except that the amount of chromium compound was changed as shown in Table 2 below.

EXAMPLE 28

0.03 parts by weight of chromium phosphate were shaken and then 100 parts by weight of ZnS:Ag were added and shaken for 30 minutes. Thereafter, 0.5 parts by weight of $ZnSO_4$ were then added thereto and shaken for 30 minutes. After $NH_4OH$ was added to the resulting product to adjust it to a ph of 7 the resulting phosphor was dried in an oven at about 100° C. for one day or more to produce blue phosphor.

EXAMPLE 29

0.05 parts by weight of water-soluble chromium sulfate were dissolved in distilled water, and 100 parts by weight of ZnS:Ag were added thereto and shaken. Thereafter, an excess of ammonium hydroxide was added thereto to precipitate the chromium compound on the surface of the phosphor. The phosphor obtained was filtered and dried at about 100° C. for over one day to produce blue phosphor.

Comparative Example 4

The blue phosphor was prepared by the same procedure described in Example 22 except that a chromium compound was not added to phosphor.

The relative brightness and color coordinates of the phosphors produced by the above examples 22 to 29 and comparative example 4 were determined and the results thereof are shown in Table 3 below. The relative brightness was determined by applying 10 kV to a demountable CRT on which the phosphors of the examples 22 to 29 and comparative example 4 are coated. The phosphor screen to determine the brightness was prepared by a precipitation method by using barium acetate and potassium silicate.

TABLE 3

|  | Amounts of Cr compound to be added (parts by weight) | Relative brightness (%) | Color coordinate (x, y) |
| --- | --- | --- | --- |
| Example 22 | 0.02 | 108 | 0.1511, 0.0690 |
| Example 23 | 0.03 | 108 | 0.1502, 0.0682 |
| Example 24 | 0.04 | 108 | 0.1496, 0.0671 |
| Example 25 | 0.05 | 110 | 0.1502, 0.0685 |
| Example 26 | 0.06 | 106 | 0.1493, 0.0674 |
| Example 27 | 0.07 | 108 | 0.1594, 0.0677 |
| Example 28 | 0.04 | 105 | 0.1502, 0.0686 |
| Example 29 | 0.05 | 104 | 0.1508, 0.0679 |
| Comparative example 4 | 0 | 100 | 0.1501, 0.0683 |

As shown in Tables 1 to 3, the brightness of phosphor according to the present invention increased by 10% without any change of the color coordinate.

Figure 2:
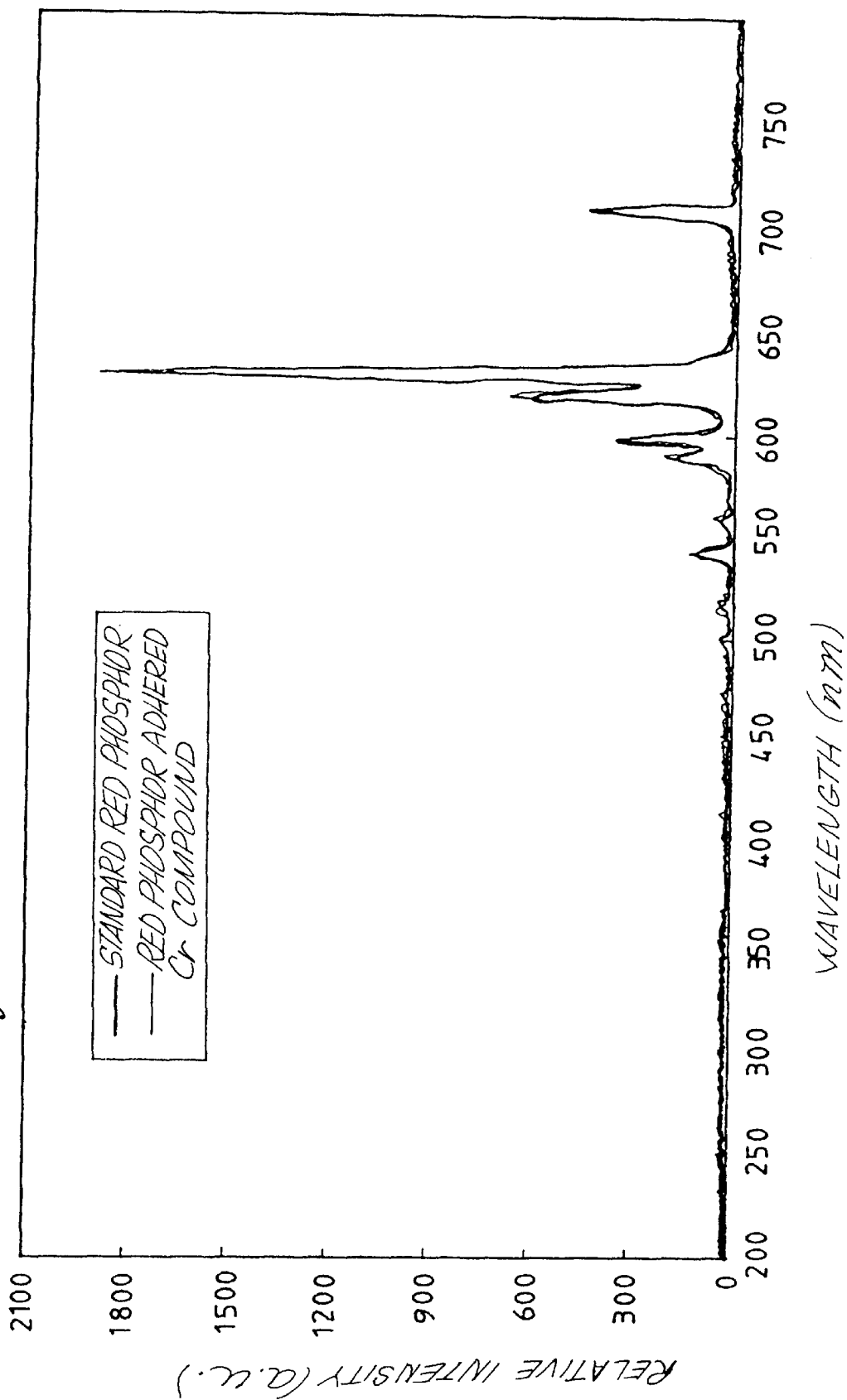
FIG. 2 is a graph showing luminescence spectrums of conventional red phosphor on which chromium compounds are not adhered and red phosphor on which chromium compounds are adhered according to one embodiment of the present invention.
Figure 3:
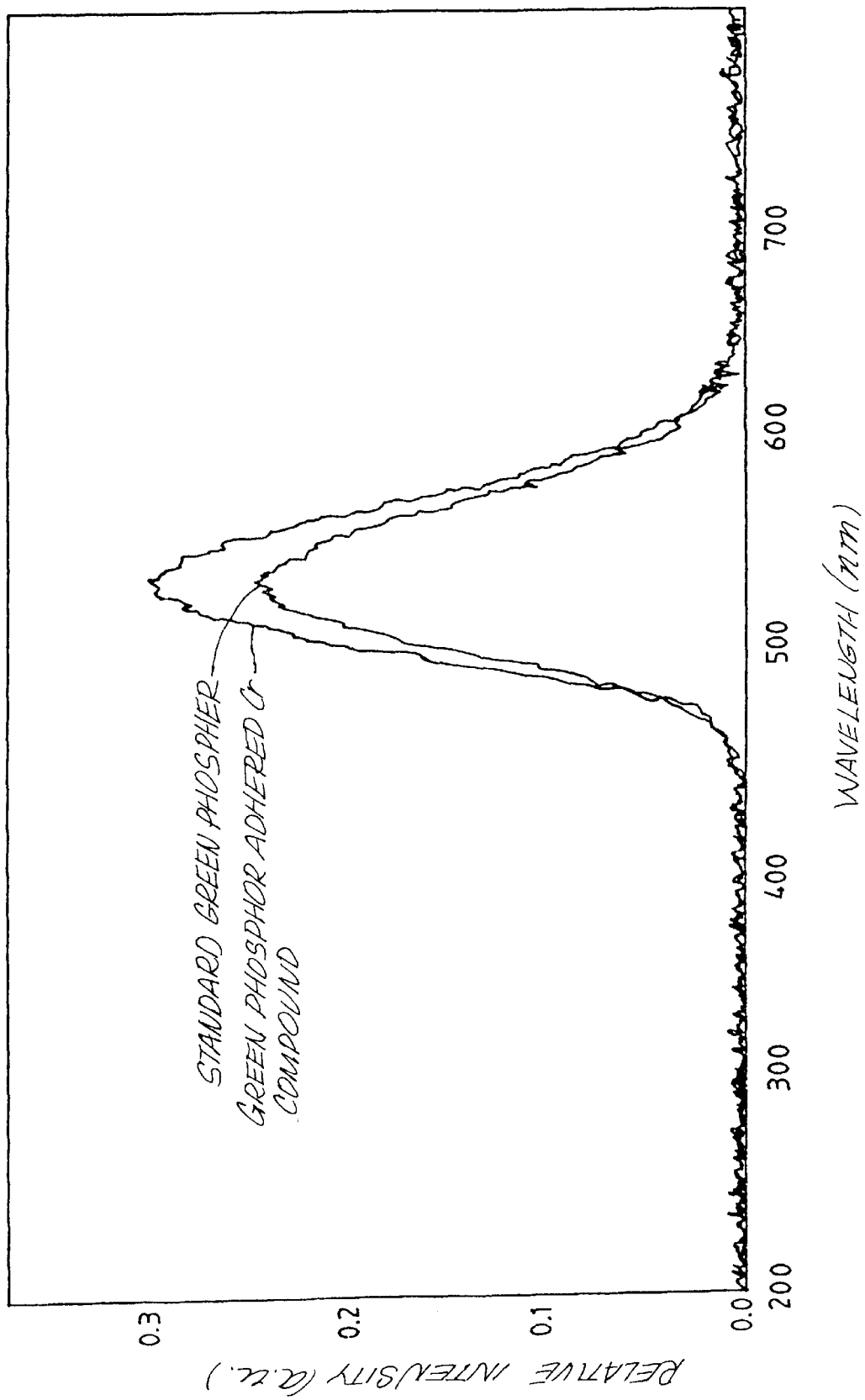
FIG. 3 is a graph showing luminescence spectrums of conventional green phosphor on which chromium compounds are not adhered and green phosphor on which chromium compounds are adhered according to another embodiment of the present invention.

Furthermore, as shown in FIGS. 2 to 4, illustrating luminescence spectrums of standard phosphors and the phosphor on which 0.03 parts by weight of Cr compound is adhered, the height of spectrum of the phosphor of this invention is incredibly increased. Therefore, it has been shown that a Cr compound can increase the efficiency of cathodoluminescence. Therefore, adherence of a Cr compound to a phosphor can increase the brightness of the phosphor without largely changing the property of phosphor.

As shown in Tables 1 to 3 and FIGS. 2 to 4, when a chromium compound is adhered to a phosphor, brightness of the phosphor can be increased without changing the characteristic of the phosphor.

In this disclosure, there has been shown and described only the preferred embodiment of the invention, but, as aforementioned, it is to be understood that the invention is capable of use in various combinations and environments and is capable of changes or modifications within the scope of the inventive concepts as expressed herein.

What is claimed is:

1. An improved phosphor complex having high brightness comprising:

a phosphor; and a material comprising a chromium compound selected from the group consisting of chromium phosphate and chromium fluoride which adheres to the surface of said phosphor and is capable of facilitating electron transfer.

2. The improved phosphor complex of claim 1, wherein the chromium compound comprises a water-insoluble chromium compound.

3. The improved phosphor complex of claim 1, wherein the amount of chromium compound is 0.00001 to 5.0 wt % based on the weight of the phosphor.

4. The improved phosphor complex of claim 1, wherein a diameter of the chromium compound is within the range of 10 nm to 1 $\mu$m.

5. The improved phosphor complex of claim 1, wherein the phosphor is red phosphor comprising $Y_2O_2S$:Eu or $Y_2O_3$:Eu.

6. The improved phosphor complex of claim 1, wherein the phosphor is green phosphor comprising ZnS:Cu,Al or ZnS:Cu,Al,Au.

7. The improved phosphor complex of claim 1, wherein the phosphor is blue phosphor comprising ZnS:Ag or ZnS:Ag,Cl.

8. The improved phosphor complex of claim 1 wherein the amount of chromium compound is from 0.00001 to 1.0 wt % of the phosphor.

9. The improved phosphor complex of claim 1 wherein the amount of chromium compound is from 0.01 to 0.15 wt % of the phosphor.

* * * * *